United States Patent
Prochaska et al.

(10) Patent No.: US 7,192,528 B2
(45) Date of Patent: Mar. 20, 2007

(54) SELF-CLEANING FILTER APPARATUS

(75) Inventors: James F. Prochaska, College Station, TX (US); Justin J. Prochaska, College Station, TX (US)

(73) Assignee: JNM Technologies, Inc., Bryan, TX (US)

( * ) Notice: Subject to any disclaimer, the term of this patent is extended or adjusted under 35 U.S.C. 154(b) by 404 days.

(21) Appl. No.: 10/778,395

(22) Filed: Feb. 17, 2004

(65) Prior Publication Data

US 2005/0178704 A1 Aug. 18, 2005

(51) Int. Cl.
*B01D 29/66* (2006.01)

(52) U.S. Cl. .................. 210/798; 210/333.01; 210/108; 210/350; 210/351; 210/352

(58) Field of Classification Search ........ 210/350–352, 210/333.01, 108, 106, 411, 798
See application file for complete search history.

(56) References Cited

U.S. PATENT DOCUMENTS

| | | | |
|---|---|---|---|
| 984,704 A | 2/1911 | Rarick | |
| 2,440,384 A | 4/1948 | Schenke | |
| 2,538,575 A | 1/1951 | Kracklauer | |
| 2,553,820 A * | 5/1951 | Gunn | 210/492 |
| 2,692,686 A * | 10/1954 | Fleck et al. | 210/97 |
| 3,228,524 A * | 1/1966 | Richards | 210/138 |
| 3,276,594 A | 10/1966 | Gwilliam | |
| 4,042,504 A | 8/1977 | Drori | |
| 4,379,058 A | 4/1983 | Bolton | |
| 4,552,655 A | 11/1985 | Granot | |
| 4,655,910 A | 4/1987 | Tabor | |
| 4,655,911 A | 4/1987 | Tabor | |
| 4,714,552 A | 12/1987 | Tabor | |
| 4,762,615 A * | 8/1988 | Drori | 210/333.01 |
| 4,776,962 A * | 10/1988 | Wakeman | 210/748 |
| 4,806,217 A | 2/1989 | Rosenberg | |
| 4,935,126 A | 6/1990 | Drori | |

(Continued)

FOREIGN PATENT DOCUMENTS

EP 347477 12/1989

OTHER PUBLICATIONS

Disk Filtration: Something Old, Something New, by James F. Prochaska, M.S., P.E., undated.

(Continued)

*Primary Examiner*—Terry K. Cecil
(74) *Attorney, Agent, or Firm*—Pravel Intellectual Property Law, P.C.; James W. Pravel (57) ABSTRACT

A self-cleaning filter system is disclosed that includes an inlet fitting that is adapted to be inserted into an existing filter body. A spray tube having a plurality of outlets that slideably engages the inlet fitting, is positioned in the ring discs of the existing filter and a compression member proximate to one end of the ring discs applies a compressive force to the ring discs. When fluid enters the spray tube from the inlet fitting compression on the ring discs is reduced to allow the ring discs to separate while fluid pressure is simultaneously imposed on the ring discs through a plurality of outlets to clean the filter component. The parts included with the system may be used to convert a manual filter into a self-cleaning filter system.

13 Claims, 8 Drawing Sheets

U.S. PATENT DOCUMENTS

| | | |
|---|---|---|
| 4,941,971 A | 7/1990 | Albright |
| 5,192,429 A | 3/1993 | Bader |
| RE34,218 E | 4/1993 | Drori |
| 5,228,993 A * | 7/1993 | Drori .......................... 210/332 |
| 5,558,761 A | 9/1996 | Elliot-Moore et al. |
| 5,560,820 A | 10/1996 | Consolo |
| 5,855,799 A | 1/1999 | Herrmann |
| 5,882,528 A | 3/1999 | Davidson |
| 5,984,108 A | 11/1999 | Choi |
| 6,200,467 B1 | 3/2001 | Nagaoka |
| 6,398,037 B1 | 6/2002 | Sadan et al. |
| 6,419,826 B1 | 7/2002 | Lara et al. |
| 6,576,146 B2 | 6/2003 | Fry et al. |
| 6,752,920 B2 * | 6/2004 | Harris et al. ................. 210/107 |
| 2002/0027111 A1 | 3/2002 | Ando et al. |
| 2002/0130092 A1 | 9/2002 | McCune et al. |

OTHER PUBLICATIONS

Netafin USA, Bioline Design Guide.
Arkal Library on Compact Disk.

* cited by examiner

FIG. 1

(PRIOR ART)

SELF-CLEANING FILTER APPARATUS

BACKGROUND

37 C.F.R. § 1.77(b)(5)

The present invention relates to filters and more particularly to a self-cleaning filter systems. The self-cleaning filter system cleans ring disc media effectively without the need to open and clean the filter manually.

Ring disc filter elements were originally developed to filter hydraulic fluid for military aircraft and have gradually found widespread use in agricultural irrigation and in industrial applications. Ring discs are highly efficient in their ability to filter particulates from fluids. The ring discs are diagonally grooved on both sides to a specific micron size. A series of the ring discs are then stacked and compressed on a spine. When stacked, the grooves on top of each disc runs opposite from the grooves below it, creating a filtration system having a series of grooves and traps for solids.

Agricultural irrigation systems that use ring disc filters are typically large scale and require high flow, high volume filters. It is typical for filters used in large-scale agricultural irrigation systems to exceed a flow rate of 25 gallons per minute. The large-scale ring disc filters that have the ability to provide back flushing of the ring discs tend to include complex mechanisms. For example, complex flapper type valves for controlling the flow direction are shown in U.S. Pat. Nos. 4,655,910 and 4,655,911. Other complex back flushing ring disc filters use a funnel shaped rubber sleeve to control the flow direction. For example, see U.S. Pat. No. 6,398,037. A spring loaded valve system is another complex approach that is shown in U.S. Pat. No. 6,419,826.

Because of the effectiveness of ring disc filter systems, their use has spread into smaller applications such as plant nurseries, greenhouses and wastewater treatment systems. They are also now being used in such industries as food and beverage, pulp and paper, mining, textile, chemical, pharmaceutical, electronic, refinery, power generation, and aquaculture. Typically, for small-scale applications, the ring disc filters are manual, non-backflushing filters. Backflushing reduces the frequency of required disassembly of the filter and ring discs, improves the operation of the filter system and it reduces labor costs.

Because the majority of self-cleaning filter systems are limited to applications where flow rates typically exceed 25 gallons per minute, water systems with lower flows must rely on manual filters or partially self-flushing filters.

Manual filters do not have any mechanism for backflushing while partially self-flushing filters are used together with valves that reverse the direction of fluid flow to flush particulate matter out of the ring disc media. The partially self-flushing filters are an improvement over the manual filters but because of the structure of ring disc filter media, tend not to be effective in removing particulate matter. Particles can become lodged in the grooves in the surfaces of the ring discs and water that is simply flushed back through them in the reversed direction does not direct enough velocity at the grooves of the discs necessary to remove the particles. Furthermore, the ring discs tend to stay compacted together and the generalized fluid flow does not separate the ring discs sufficiently to allow fluid flow to be directed to the grooves in the ring discs or around the grooved surfaces of the ring discs.

Ring disc filter manufacturing companies have not found it cost effective to manufacture small, self-cleaning filters. As a result, there is a need for a low volume, low flow rate, self-cleaning filter.

SUMMARY OF THE INVENTION

37 C.F.R. § 1.77(b)(6)

The invention involves a self-cleaning filter system. Manual filter systems include a filter body with an inlet and an outlet, a filter cover and ring disc filter elements. The improvement includes an inlet fitting that is adapted to be inserted into the filter body. A spray tube that has a plurality of orifices slideably engages the inlet fitting. The spray tube is positioned inside of the ring discs that are contained in the filter cover. A compression member proximate to one end of the ring discs applies a compressive force to the ring discs. When fluid flows into the filter body through the spray tube to clean the ring discs, fluid flows through the spray tube and against the compression member. The pressure acting against the compression member reduces the compression on the ring discs allowing them to separate. During the cleaning process, the reversed fluid flow flows out of the orifices in the spray tube toward the ring discs.

The outlets in the spray tube are at an oblique angle relative to the wall of the spray tube. Fluid that is forced through the outlets at an oblique angle directs pressure against the ring discs also at an oblique angle. This causes the ring discs to spin which helps to agitate particles on the grooves on the ring discs. The outlets can also be at an upward angle to force the ring discs upwardly. By forcing the ring discs upwardly, the ring discs are separated effectively, even the ring discs on the lower part of the stack.

Compression can be applied to the ring discs in several different ways. In one preferred embodiment, an external compressor is positioned outside of the filter cover that engages a compression rod to apply compression to a compression plate above the ring discs. The external compressor may either use a spring compressor or a hydraulic compressor. In another preferred embodiment, a spring is positioned inside of the filter cover that imposes pressure on a compression plate. In another alternative embodiment, the internal spring and an external compressor are used to compress the compression plate and the ring discs.

The invention can also be used to convert an existing manual filter into a self-flushing filter so that the resulting converted manual filters may be economically used for low volume and low flow rate applications. Unlike the prior art, the invention does not require a complex internal mechanism.

The spray tube of the invention directs high velocity fluid into spaces between ring discs to clean particles and residual materials from grooves in ring discs. After installing the self-cleaning kit, the resulting filter operates more efficiently than a manual filter, does not require regular cleaning and therefore requires less labor costs to operate.

To clean the self-cleaning filter system, the operator simply directs flow through the spray tube, restricts flow exiting from the outlet and allows flow to exit the inlet. Control of the flow may be achieved with conventional methods of manual valves or electric valves. The procedure can be automated with the use of a computer control system that is interfaced to the electric valves or other flow control devices.

Because the frequency of required cleaning of the ring discs is determined by the amount of particles and solids that are build up on and around the ring discs, the self-cleaning filter system can be further automated by sensing the pressure differential between the inlet flow and the outlet flow. At a predetermined pressure differential, which corresponds to a predetermined amount of contamination, the outlet is closed, flow to the spray tube is opened, and the filter is flushed. The predetermined pressure differential can trigger an alarm that alerts an operator to flush the filter, or a computer can control the valves to flush the filter automatically without human intervention.

BRIEF DESCRIPTION OF THE DRAWINGS

37 C.F.R. § 1.77(b)(7)

Eight (8) sheets of drawings are attached.

DETAILED DESCRIPTION OF THE INVENTION

37 C.F.R. § 1.77(b)(8)

Figure 1:
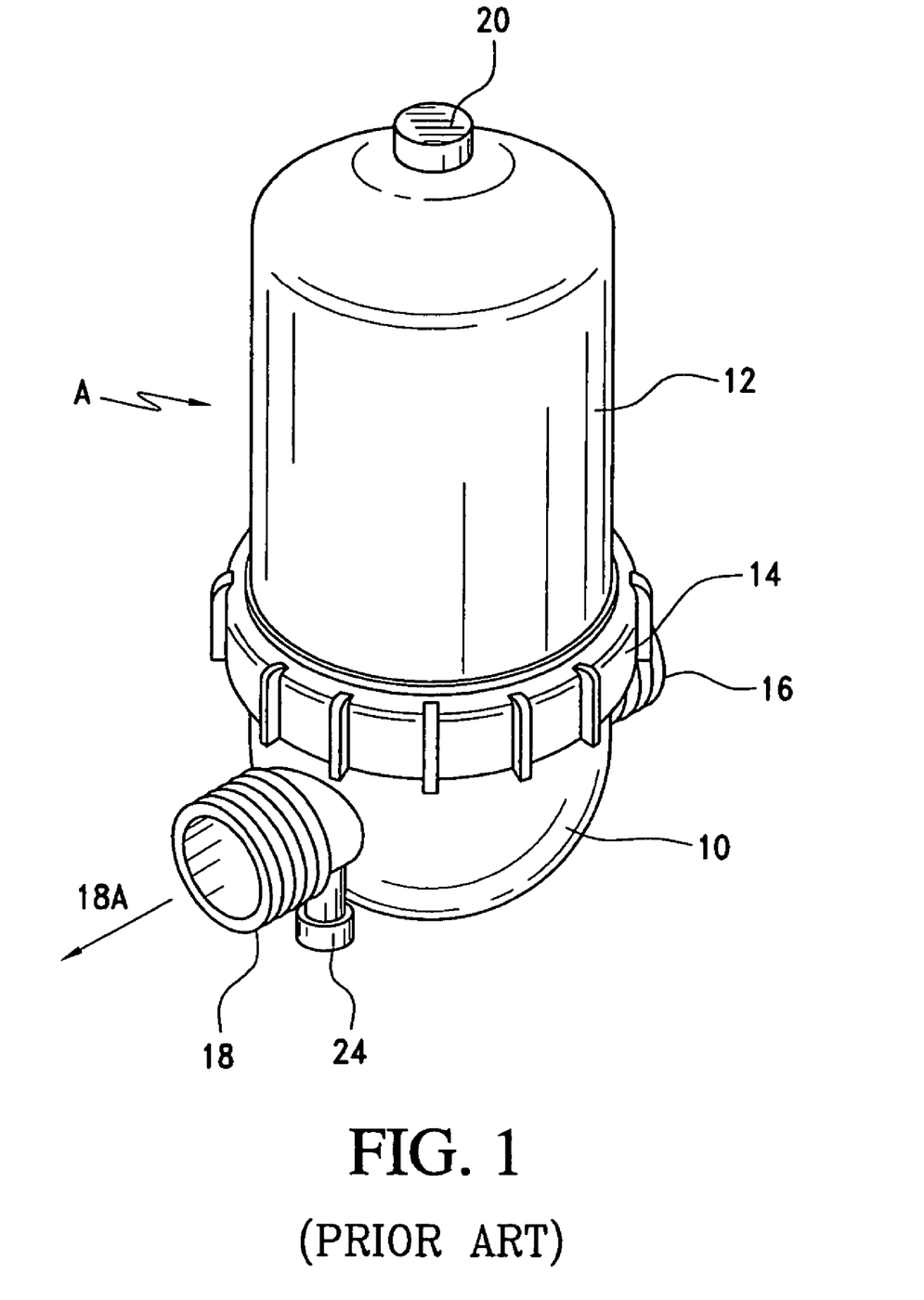
FIG. 1 is the outside view of a prior art ring disc filter assembly.
Figure 2:
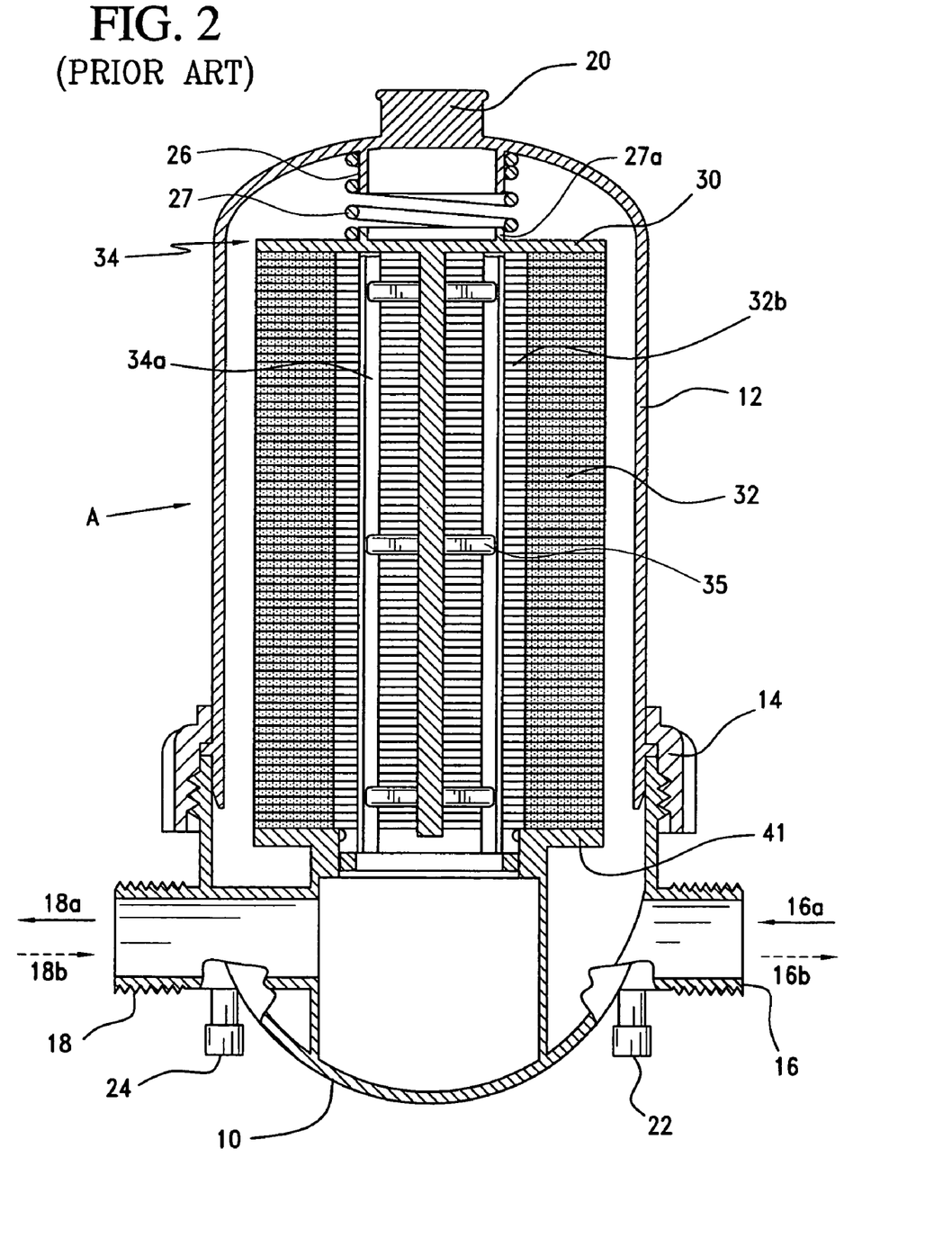
FIG. 2 is a cross section view of a prior art ring disc filter assembly.

Prior Art Manual Filter:

FIG. 1 shows the outside view of a conventional prior art manual ring disc filter assembly generally referred to by the letter A. FIG. 2 shows a sectional view of the manual ring disc filter assembly A of FIG. 1. The manual ring disc filter assembly has a body 10 that includes an inlet 16 and an outlet 18. The housing 12 is attached to the body 10 with a threaded securing ring 14. On the top of the cover 12 is a port 20 that is generally provided molded in, undrilled and untapped as shown in FIGS. 1 and 2. An inlet pressure measuring port 22 and an outlet pressure measuring port 24 are provided to allow pressure measurements to be taken to determine the pressure drop across the ring disc filters 32. The inlet pressure measuring port 22 and outlet pressure measuring port 24 may secondarily be used to drain fluid from the inlet 16 and outlet 18, respectively. A stack of ring discs 32 are located on the spine 34 and positioned on the top of the flow diverter 41. The spine 34 includes several spine legs 34a that extend from a compression plate 30 that is positioned on the top of the stack of ring discs 32. The spine legs 34a in the conventional filter A include cross members 35 that provide structural support to the spine legs 34a and to the ring discs 32 before and after assembly. An internal spring 27 urges the compression plate 30 downwardly and compresses the ring discs 32 together. The spring is uniform in diameter along its length and is held in position on the compression plate 30 with a raised ring 27a.

Figures 5, 5A:
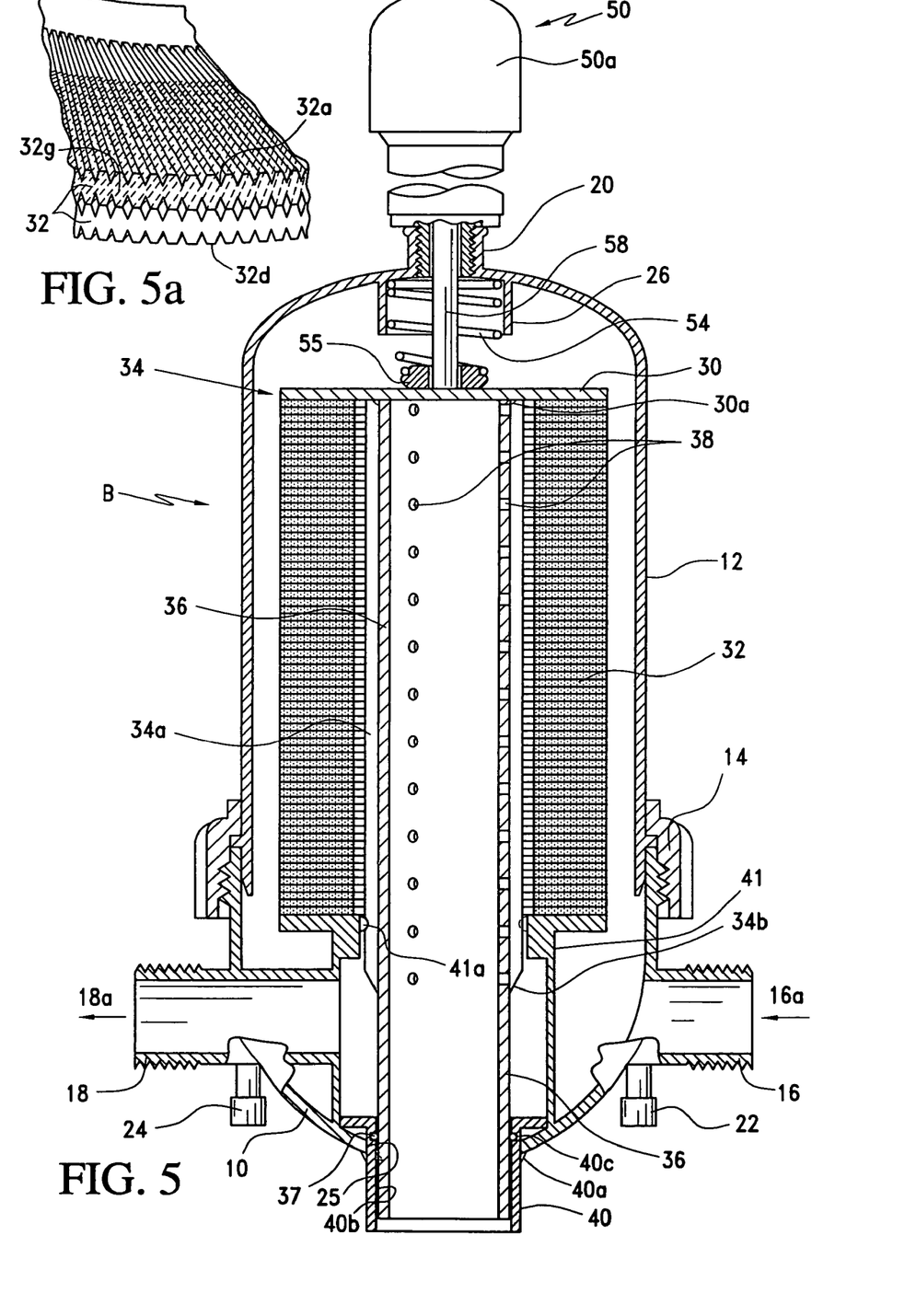
FIG. 5 is a cross section view of an embodiment of the self-cleaning filter system showing the inlet and exit flow paths and including a spring compressor together with an internal spring.
FIG. 5a is an isometric view of a portion of the ring disc filter elements in the normal compressed filtering mode.
Figures 7, 7A:
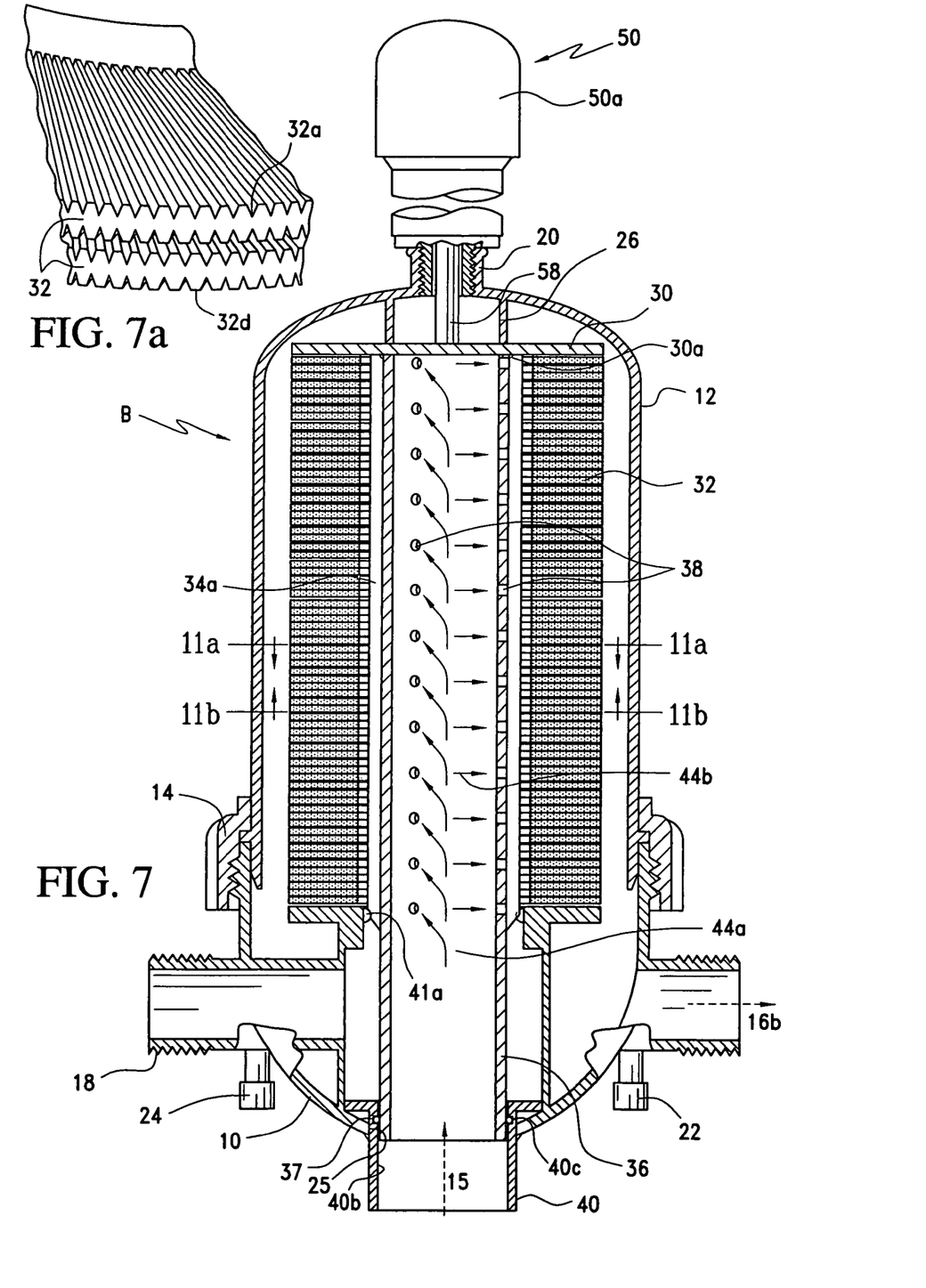
FIG. 7 is the self-cleaning filter kit of FIG. 4, showing the effect of reversed flow on the spray tube, compression plate and ring discs.
FIG. 7a is an isometric view of a portion of the ring disc filter elements in the normal compressed filtering mode.
Figures 8, 9, 10, 11A, 11B:
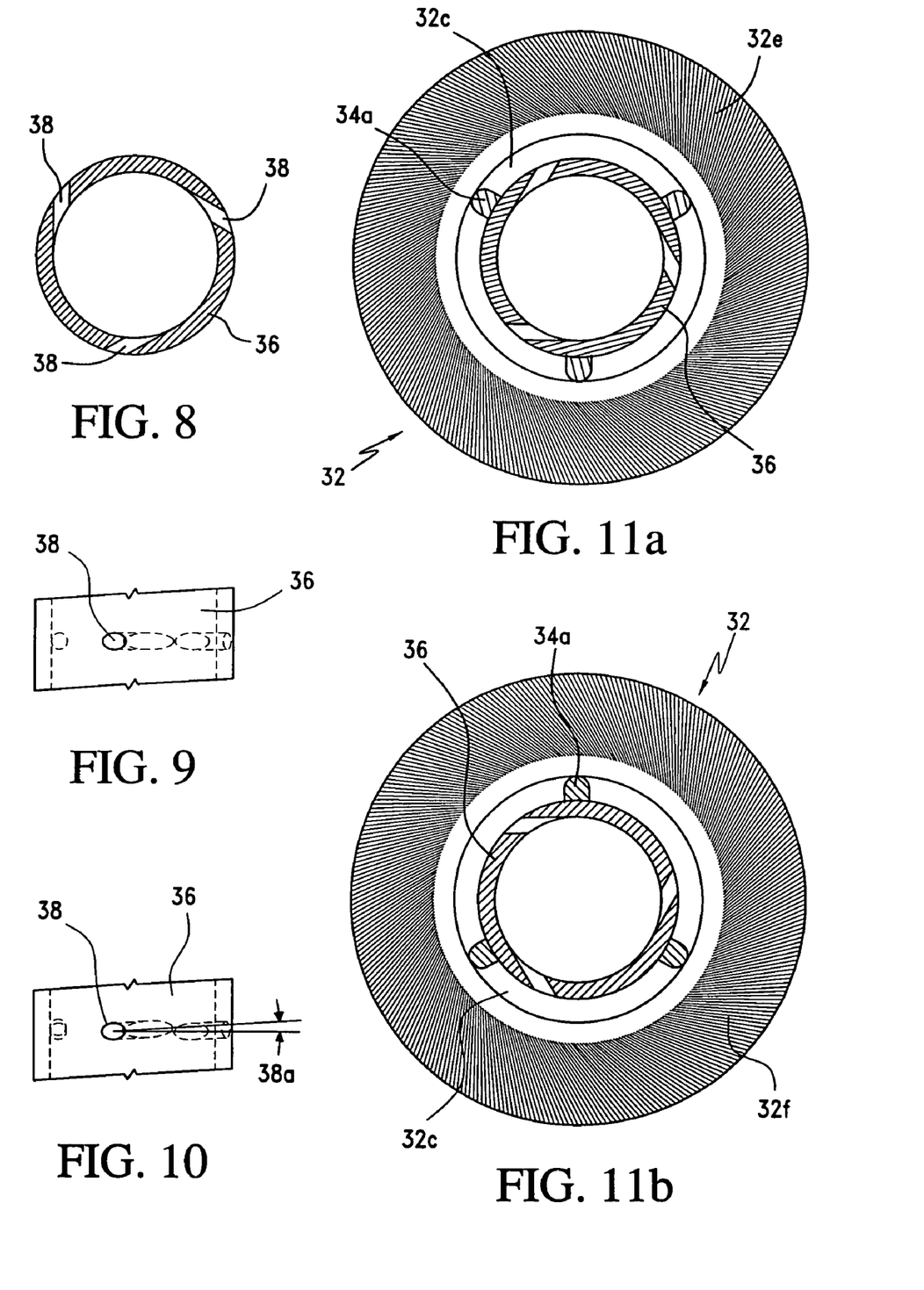
FIG. 8 is the cross section, taken on line 9—9 in FIG. 3, showing the tangential direction of the orifices.
FIG. 9 is a side view of the part shown in section FIG. 8.
FIG. 10 is a side view of the part shown in FIG. 9 showing the orifice upward angle.
FIG. 11a is a view of the top of a ring disc, including a section view of the spray tube and spine legs, taken on line 11a—11a in FIG. 7.
FIG. 11b is a view of the bottom of a ring disc, including a section view of the spray tube and spine legs, taken on line 11b—11b in FIG. 7.

As is known, the detailed view of the ring discs in FIGS. 11a and 11b, show ring discs 32 having grooves 32a and ridges 32d that radiate outwardly on their surfaces. The enlarged view of the grooves 32a and ridges 32d are shown in FIGS. 5a and 7a. When the bottom surface 32f of a ring disc 32 is placed on top of the top surface 32e of another ring disc 32, the direction of the grooves 32a and ridges 32d run in opposite directions, thereby creating an intersection of the grooves 32a and 32d. The intersections 32g of the grooves 32a and ridges 32d, best seen by the hidden lines in FIG. 5a, trap solid particles to prevent them from passing through between the ring discs 32, but allow fluid to pass. The ring discs 32 are typically constructed of polypropylene or other polymer material, depending upon the fluid being filtered.

During normal operation of the prior art device A, fluid of the inlet flow 16 to be cleaned enters the filter body through the inlet 16. The flow diverter forces the fluid to travel up and around the ring discs 32. The fluid is then forced to travel between the ring discs 32. Particles that are contained in the fluid are trapped at the intersections 32g between the grooves 32a and ridges 32g of the ring discs 32. The filtered fluid that has passed between the ring discs 32 travels down the open filtrate flush space 32b of the ring discs 32 and out the outlet 18. Over time, particles build up in the grooves 32a and particles and other solid matter collects on the outside of the ring discs 32. The build up of particles reduces the efficiency of the filtration and in time, can totally block the flow of fluid into or out of the filter.

To clean the manual filter, the filter ring cover 12 must be removed, and then the ring discs 32 must be removed and sprayed with water or other cleaning fluid. Alternatively, a conventional backflush may be performed by reversing the flow direction in an attempt to free particles from the grooves 32a in the ring discs 32. The backflush operation is performed by first opening the inlet 16, then directing backflush fluid flow 18b into the outlet 18 to force flushing fluid to flow out from the bore 32b of the ring discs 32 and then out as backflush fluid flow 16b from the inlet 16. The fluid traveling out from the bore 32b of the ring discs 32 is intended to carry solid particles along with it out the filter inlet 16. However, it is rarely, if ever effective to try to clean the manual filter simply by reversing the fluid flow direction. The ring discs 32 are compressed together and the particulates trapped in the ring disc grooves 32a and at the intersections 32g of the grooves 32a and ridges 32d are generally not easily removed. As a result, the manual filters typically must be disassembled and cleaned by hand, either regularly or periodically with backflushing performed between manual disassemblies.

Figure 3:
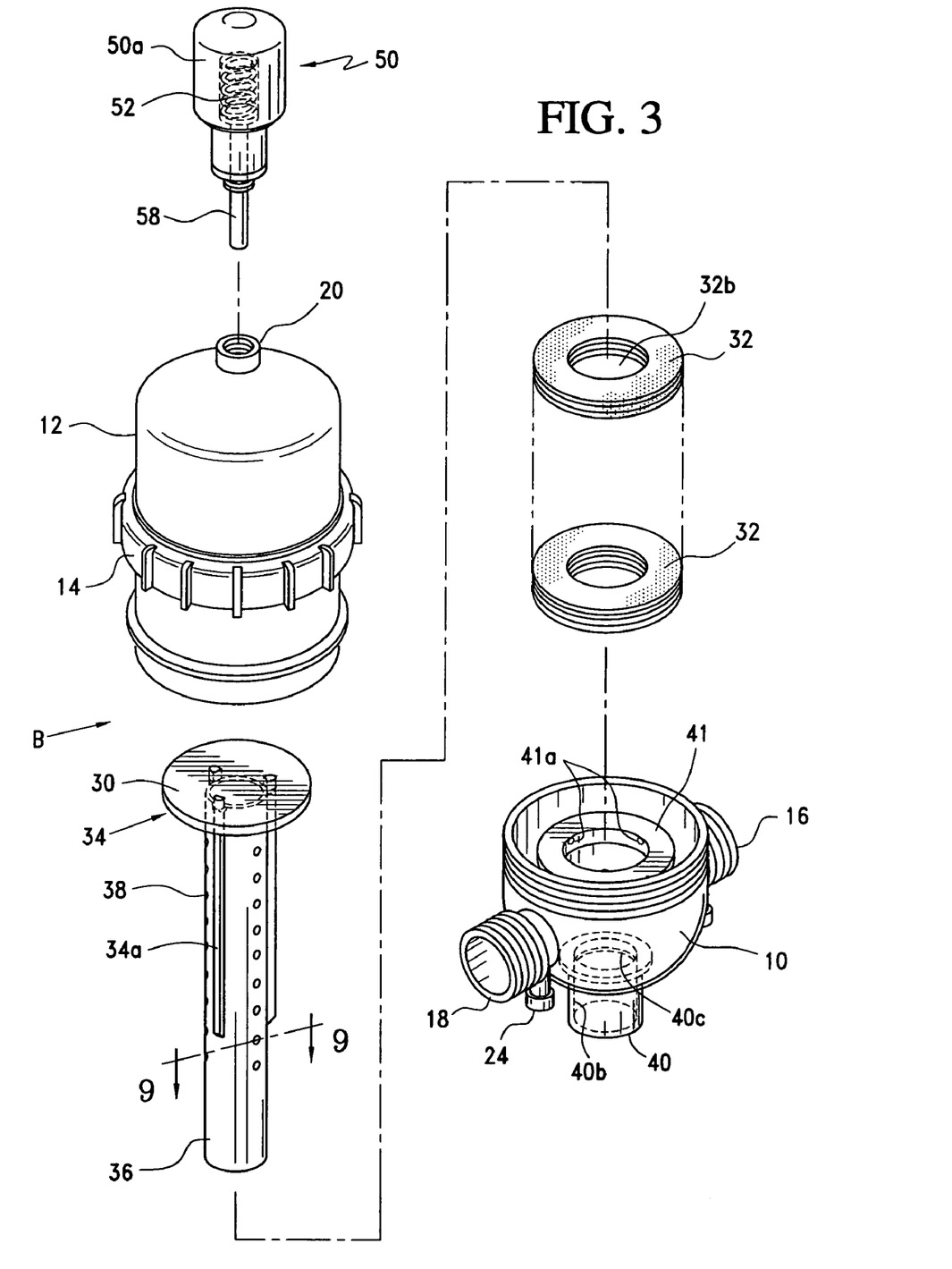
FIG. 3 is an assembly drawing of an embodiment of the self-cleaning filter system including a spring compressor.
Figure 4:
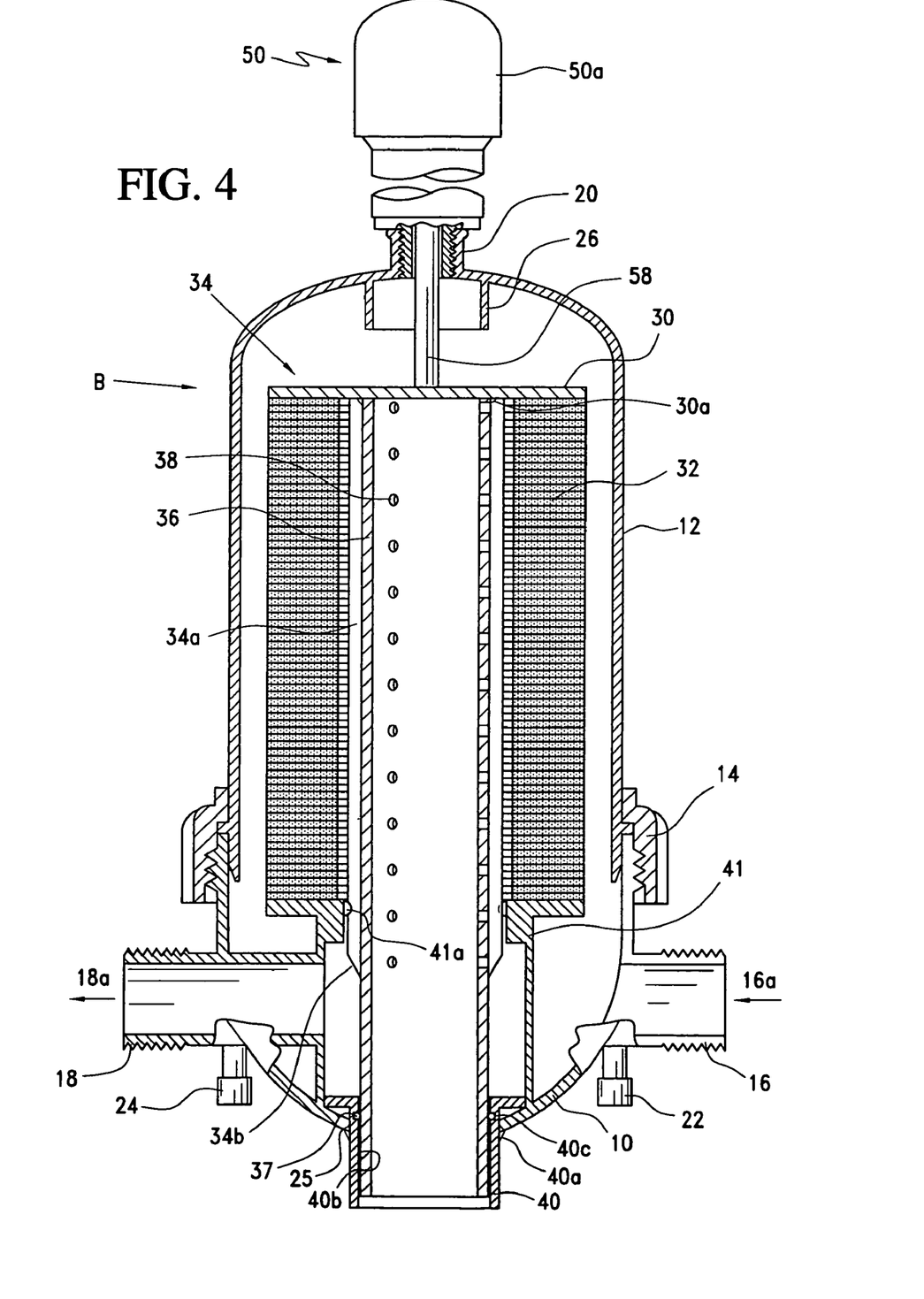
FIG. 4 is a cross section view of an embodiment of the self-cleaning filter system including a spring compressor.

Self-Cleaning Filter Apparatus:

An assembly drawing showing a manual filter A with the improved elements of an embodiment of the invention is shown in FIG. 3. The improved elements may be included as an overall filter assembly B or may be provided as a kit to convert an existing manual filter A into a self-cleaning filter assembly B. The overall self-cleaning filter assembly is referred to generally by the letter B. A sectional view of the manual filter A with the self-cleaning kit installed is shown in FIGS. 4 and 5. An opening 25 is first formed in the body 10 sufficiently large for the inlet fitting 40 to be inserted. Before inserting the inlet fitting 40 into the opening 25 created in the body 10, a sealant, such as epoxy or other waterproof sealing material, is applied to the outside of the inlet fitting 40 and on the inside of the opening 25 of the body 10 before inserting into the opening 25 in the body 10. The sealant generally extrudes out of the opening 25 during assembly as shown at 40a. Alternative sealing techniques, such as thermo bonding between the polymeric materials, or other bonding techniques may also be used.

A spine 34 having spine legs 34a and a compression plate 30 is assembled on a spray tube 36. The spine legs 34a are generally affixed to the spray tube 36 with epoxy or other water proof adhesive material. The spine legs 34 have a tapered entry taper 34b at the end opposite from the compression plate 30 to allow for easier assembly of the ring discs 32 onto the spine 34. In the illustrated embodiment, the spine legs penetrate and are attached to the compression plate 30, as best seen in FIG. 3. Alternative spine 34 constructions are also contemplated. Although the spine legs 34a are affixed to the spray tube 36, they may be removable from the spray tube 36. The spray tube 36 is sealed at the top to the bottom side of the compression plate 30 in the position identified as 30a.

The ring discs 32 are placed onto the spine legs 34a and then the spray tube 36 is inserted into the bore 40b of the inlet fitting 40. The bore 40b of the inlet fitting 40 has a groove 40c in which an o-ring seal 37 is positioned to provide a dynamic sealing surface between the spray tube 36 and the inlet fitting 40. The o-ring seal 37 may also be replaced with an alternative seal member. The o-ring seal 37 allows the spray tube 36 to move up and down relative to the inlet fitting 40 while retaining a fluid seal between the outer surface of the spray tube 36 and the bore 40b of the inlet fitting 40.

Several small nubs 41a are positioned inside of the flow diverter. The spine legs 34a contact the nubs 41a to prevent the spray tube 36 from rotating.

After inserting the lower end of the spray tube 36 into the inlet fitting 40, the ring discs 32 are positioned on top of the flow diverter 41. On the upper end of the spine 34, the upper surface of the ring disc 32 on the top of the stack of ring discs 32 is in contact with the lower surface of the compression plate 30. After the spray tube 36, spine 34 and ring discs 32 have been installed into the filter body 10, the filter cover 12 is installed on the filter body 10 and secured with the securing ring 14.

In FIGS. 3, 4, 5, 6a and 7 a spring compressor body 50a is shown connected to the top of the filter cover with a threaded connection at the port 20. The port 20, on the existing filter cover 12 in the prior art device of FIGS. 1 and 2 can be drilled and tapped with threads if it has not been previously adapted to receive a threaded member. A compressor spring 52 (FIG. 3) is contained within the compressor body 50a. A compression rod 58, which is limited by the compressive strength of the compressor spring 52, extends out of the bottom of the spring compressor 50. As shown in FIG. 4, after the compressor body 50a is threaded into the port 20, the compression rod 58 extends and contacts the top of the compression plate 30. The upward travel of the compression rod 58 is limited by the compressor spring 52 and the resulting compression is transferred to the compression plate 30. Collar 26 in the cover 12 may be engaged by the compression plate 30 to limit the upward travel of the compression plate 30. The compression plate 30 exerts compression onto the stack of ring discs 32 to hold each of the individual ring discs 32 close together. The resistance of the compression provided by the compressor spring 52 can be varied to increase the compression of the ring discs 32. As shown in FIG. 5, additional downward compression may also be provided by inserting an internal spring 54 between the inside of the top of the filter cover 12 and the top of the compression plate 30. Depending on the strength of the springs 52 and 54, it is also possible to use the internal spring 54 by itself without the external compressor 50 (See FIG. 6c). The configuration that excludes the external compressor body is advantageous in situations where available space for the filter assembly is limited.

Figures 6A, 6B, 6C:
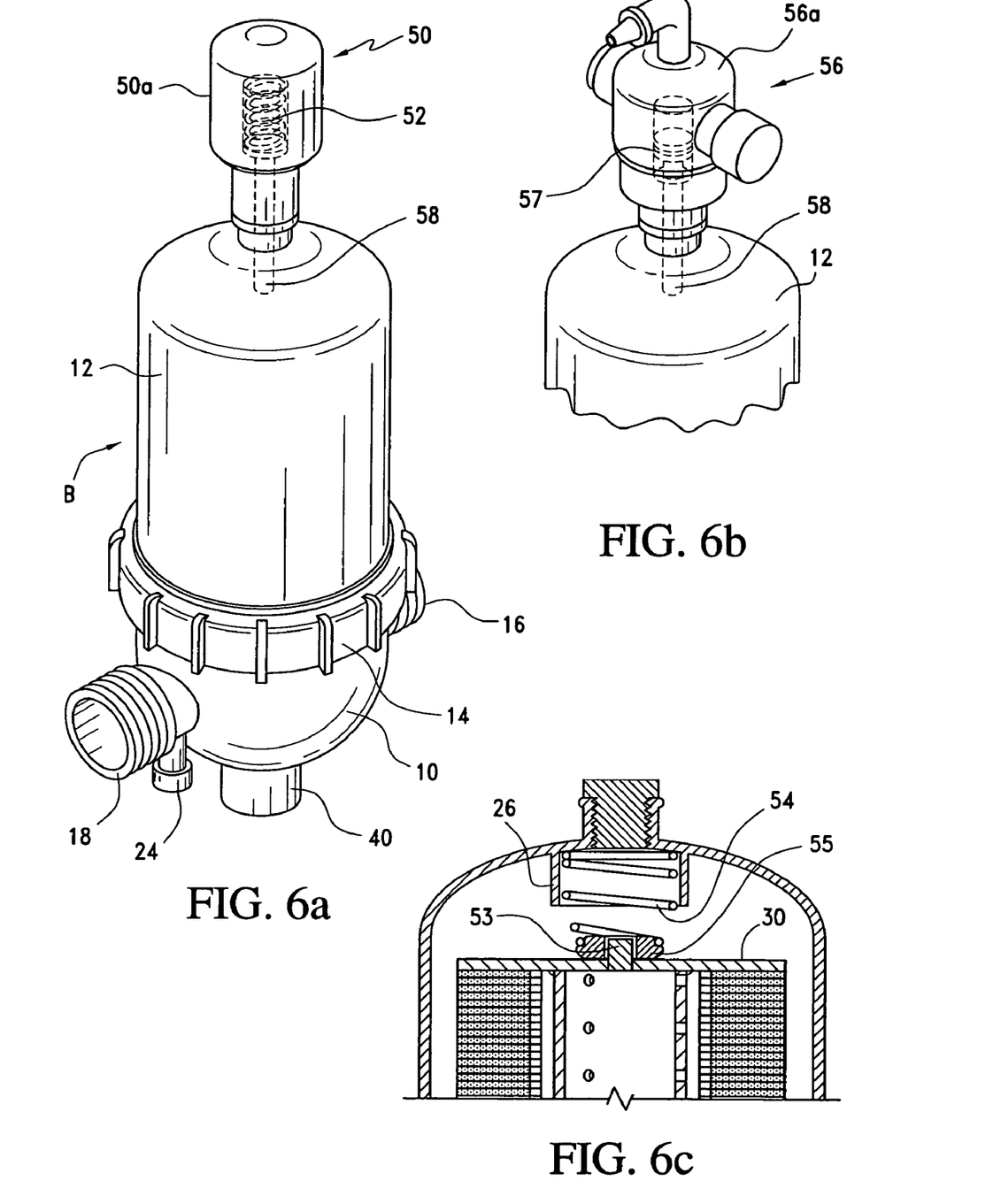
FIG. 6a is an outside view of an embodiment of the self-cleaning filter system that includes a spring compressor.
FIG. 6b is a partial view of an embodiment of the self-cleaning filter system that includes a hydraulic compressor.
FIG. 6c is a partial view of an embodiment of the self-cleaning filter system that includes an internal spring.

When the internal spring 54 is used by itself a button 55 on the lower end of the spring 54, which has a hole positioned at its center, engages a post 53. The post 53 is secured to the compression plate 30 and ensures that the spring 54 stays in the proper position on the center of the compression plate 30.

The desired amount of compression can vary according to the demands placed on the self-cleaning filter system B. In general, systems that use higher flow rates and higher pressures may require a higher compression on the stack of ring discs 32.

FIG. 6b shows a hydraulic compressor 56 that performs a function similar to the spring compressor 50, but uses hydraulic pressure instead of compression from a spring. The hydraulic compressor 56 includes a compressor body 56a that houses a hydraulic compressor piston 57. The hydraulic compressor piston 57 engages the compression rod 58 to compress the compression plate 30 and the stack of ring discs 32.

FIGS. 4 and 5 show the self-cleaning filter assembly B in the compressed mode. The filter assembly is usually in the compressed mode during normal filter operations. During normal filter operations inlet flow 16a enters the filter body 10 through the inlet 16 (FIGS. 4 and 5). The flow is directed to the outside of the ring discs 32 by the flow diverter 41. Fluid must then flow through the spaces or gaps between the grooves 32a on the ring discs 32 (FIGS. 5a and 7a) and into the space between the spray tube 36 and the inside of the ring discs 32. This annular filtrate flush space between the spray tube and the ring discs is identified as 32c in FIGS. 11a and 11b. The ring discs 32 trap particles from the fluid that travels between them in the grooves 32a (FIGS. 5a and 7a). The depth of the grooves 32a generally determines the size of the particles that can pass between the ring discs 32. Shallower grooves 32a will trap smaller particles and deeper or wider grooves 32a will let smaller particles pass and will only trap larger particles. The fluid that has passed through the ring discs 32 exits the filter cover 12 and filter body 10 through the outlet 18 as filtered outlet flow 18a. During normal operation, when the self-cleaning filter assembly B is in the compressed mode, a conventional manual or electric valve, or other flow control device (not shown) is used to prevent flow from entering into the inlet fitting 40 or into the spray tube 36.

The self-cleaning filter assembly B in FIG. 7 is shown in the self-cleaning mode. A valve or other flow control device is used to stop flow from exiting at the outlet 18. Flushing flow 15 is then allowed to enter the spray tube 36. The flushing flow 15 travels up the spray tube 36 and is forced to flow out of the orifices 38. The upward flushing flow 15 also directs pressure to the bottom surface of the compression plate 30. The upward pressure on the compression plate forces the compression rod upwardly into the spring compressor 50 or hydraulic compressor 56. The compression plate may travel as far up as bottom edge of the collar 26. Because the compression plate is forced upwardly, the compression on the ring discs 32 is removed, which allows them to travel upwardly. The upward travel provides space or gaps between the ring discs 32 as shown in FIG. 7a so that particles and debris may be flushed from the grooves 32a on the surfaces of the ring discs 32.

Three rows of multiple orifices 38 are preferably located along the length of the spray tube 36 (FIG. 3). Although in the preferred embodiment, the rows of orifices 38 are uniformly distributed about the circumference of the spray tube 36, it is contemplated that additional rows may also be added either uniformly distributed or in a staggered pattern.

The orifices 38 are illustrated in detail in FIGS. 8–9 and show that they are typically angled tangentially relative to the wall of the spray tube 36. Because the orifices 38 are angled relative to the wall of the spray tube 36, water that is forced out of the orifices 38 strikes the ring discs 32 obliquely, thereby causing the ring discs 32 to spin. The spinning action of the ring discs 32 disrupts particles that are in the grooves 32a of the discs 32 (FIGS. 5a and 7a). The spinning action and the movement of the ring discs 32 causes turbulent flow, which further helps to agitate debris and particles that may be trapped on the grooves 32a of the ring discs 32. The turbulence and agitation of the fluid about the surfaces of the ring discs 32 is effective to cause trapped particles and solids to be flushed free. The orifices 38 may also be angled upwardly, as shown in FIG. 10. The orifice upward angle 38a is preferably 1–3 degrees above horizontal but smaller or larger angles of inclination may be used. When fluid is forced out of the orifices 38, the orifice upward angle 38a directs the fluid flow toward the discs 32 at a correspondingly upward angle. The resulting upward force imposed on the discs 32 urges them upward on the spine 34, which helps to create spaces or gaps between the individual discs 32 (FIG. 7a). In addition, the upward force on the ring discs 32 from the fluid flow overcomes the problem of the lower discs 32 tendency to stay close together. The gaps between all of the discs 32 allows the pressurized fluid traveling through the orifices 38 to effectively clean particles that may be in the grooves 32a of the discs 32.

Manual valves, electric valves, or other flow control devices may be used to control the fluid flow into and out of the self-cleaning filter. The electric valves (not shown) may also be controlled with a computer system and may be further automated by using a pressure differential detection system (not shown) together with the computer system and electric valves. When particles or other solids build up in the ring disc grooves 32a or on the outside of the ring discs 32, the pressure difference between the inlet 16 and the outlet 18 will reach a predetermined level at which point an alarm can be activated or the computer system can automatically shut the outlet 18, open the flushing flow 15 to the spray tube 36 to clean the filter. If a computer system is used together with a pressure differential sensing device, together with electric valves to control the flow, the entire self-cleaning filter can operate without human intervention.

The following table lists the part numbers and part descriptions as used herein and in the drawings attached hereto.

| Parts List | |
|---|---|
| Part Number: | Description: |
| A | Manual Ring Disc Filter Assembly |
| B | Self-Cleaning Ring Disc Filter Assembly |
| 10 | Body |
| 12 | Cover |
| 14 | Securing Ring |
| 15 | Flushing flow |
| 16 | Inlet |
| 16a | Inlet flow |
| 16b | Backflush flow out |
| 18 | Outlet |
| 18a | Outlet flow |
| 18b | Backflush flow in |
| 20 | Port (filter cover) |
| 22 | Pressure measurement port (inlet) |
| 24 | Pressure measurement port (outlet) |
| 25 | Opening for Inlet Fitting |
| 26 | Limiting collar |
| 27 | Spring |
| 27a | Raised ring |
| 30 | Compression plate |
| 30a | Spray tube seal |
| 32 | Ring disc |
| 32a | Ring disc grooves |
| 32b | Open filtrate flush space in manual filter |
| 32c | Annular filtrate flush space between spray tube and ring discs in self-cleaning filter |
| 32d | Ring disc ridge |
| 32e | Top surface of ring disc |
| 32f | Bottom surface of ring disc |
| 32g | Intersecting ridges |
| 34 | Spine |
| 34a | Spine leg |
| 34b | Spine entry taper |
| 35 | Cross member |
| 36 | Spray tube |
| 37 | o-ring seal |
| 38 | Orifice |
| 38a | Orifice upward angle |
| 40 | Inlet fitting |
| 40a | Seal of inlet fitting to body |
| 40b | Bore of inlet fitting |
| 40c | O-ring groove |
| 41 | Flow diverter |
| 42 | Backflush water inlet fitting |
| 44a | Upward flow direction |
| 44b | Tangential flow direction |
| 46 | Sealing ring |
| 50 | Spring compressor |
| 50a | Spring compressor body |
| 52 | Compressor Spring |
| 53 | Post |
| 54 | Internal Spring |
| 55 | Button |
| 56 | Hydraulic compressor |
| 56a | Hydraulic compressor body |
| 57 | Hydraulic compressor piston |
| 58 | Compression rod |

The foregoing disclosure and description of the invention are illustrative and explanatory thereof, and various changes in the size and shape of filter kit components, self-cleaning filter systems and configurations, and differing materials, as well as changes in the details of the illustrated embodiments may be made without departing from the spirt of the invention.

What is claimed is:

1. An apparatus, comprising a ring disc filter system having a housing, a stack of ring disc filter elements in the housing with an inlet and an outlet for fluid to flow from the inlet through the stack of filter elements and outwardly to the outlet, a plurality of spine legs internally of said stack of ring disc elements, a fluid diverter to direct fluid during normal filtering operations from the inlet through the ring disc filter elements to create a filtering action, the improvement comprising:
   a. a spray tube positioned internally of said spine legs and having a plurality of fluid orifices therethrough axially spaced along the length thereof;
   b. said spray tube being disposed inwardly of said stack of ring disc filter elements for directing fluid outwardly through said ring disc filter elements to flush impurities into the housing;
   c. an outlet for discharging the fluid with impurities from the apparatus; and
   d. a compression plate assembled on said spray tube for normally holding the filter elements together for filtering out impurities in the fluid; and said compression plate and said spray tube being movable together in response to fluid pressure flowing upwardly in the spray tube to relieve pressure on the filter elements to thereby open the spaces between the filter elements to facilitate the flushing action.

2. The apparatus of claim 1 wherein at least one end of said spray tube is in sealing engagement with an inlet fitting.

3. The apparatus of claim 1 including a control system for controlling the direction of flow of fluid to be filtered and backflushed through the inlet and the outlet of the apparatus.

4. The apparatus of claim 1 wherein said plurality of orifices in said spray tube are substantially tangential to the wall of said tube.

5. The apparatus of claim 1 wherein said plurality of orifices in said spray tube are angled upwardly whereby fluid flowing through said orifices directs fluid force upwardly simultaneously across multiple layers of ring disc elements.

6. The apparatus of claim 5 wherein said upward angle is between 1 and 3 degrees.

7. The apparatus of claim 1 having a compressor above said compression plate for compressing the ring disc elements together.

8. The apparatus of claim 7 wherein said compressor is inside the housing.

9. The apparatus of claim 7 wherein said compressor is outside of the housing and wherein a rod member extends into the housing from said compressor.

10. The apparatus of claim 9 wherein said compressor comprises a hydraulic member.

11. The apparatus of claim 7 wherein said compressor comprises a spring member.

12. The apparatus of claim 11 wherein said spring member is positioned with a button member that engages a post member on said compression plate.

13. A method of converting an existing manual ring disc filter system that has a housing, a stack of ring disc filter elements in the housing with an inlet and an outlet for fluid to flow from the inlet through the stack of filter elements and outwardly to the outlet, a plurality of spine legs internally of said stack of ring disc elements, a fluid diverter to direct fluid during normal filtering operations from the inlet through the ring disc filter elements to create a filtering action, to a self-cleaning ring disc filter system comprising the steps of:
   a. positioning a spray tube having a plurality of fluid orifices therethrough axially spaced along the length thereof internally of said spine legs;
   b. disposing said spray tube inwardly of said stack of ring disc filter elements for directing fluid outwardly through said ring disc filter elements to flush impurities into the housing;
   c. providing an outlet for discharging the fluid with impurities from the apparatus; and
   d. assembling a compression plate on said spray tube for normally holding the filter elements together for filtering out impurities in the fluid; said compression plate and said spray tube being movable together in response to fluid pressure flowing upwardly in the spray tube to relieve pressure on the filter elements to thereby open the spaces between the filter elements to facilitate the flushing action.

* * * * *